US011580000B2

(12) United States Patent
Wallman et al.

(10) Patent No.: US 11,580,000 B2
(45) Date of Patent: Feb. 14, 2023

(54) SYSTEMS AND METHODS FOR LOCAL RANDOMIZED BENCHMARKING

(71) Applicant: Keysight Technologies Canada Inc., Loveland, CO (US)

(72) Inventors: Joel J. Wallman, Kitchener (CA); Joseph Emerson, Kitchener (CA)

(73) Assignee: Keysight Technologies Canada Inc., Mississauga (CA)

(*) Notice: Subject to any disclaimer, the term of this patent is extended or adjusted under 35 U.S.C. 154(b) by 1211 days.

(21) Appl. No.: 16/042,978

(22) Filed: Jul. 23, 2018

(65) Prior Publication Data
US 2019/0026211 A1    Jan. 24, 2019

Related U.S. Application Data

(60) Provisional application No. 62/535,953, filed on Jul. 23, 2017.

(51) Int. Cl.
| | |
|---|---|
| G06F 11/34 | (2006.01) |
| G06F 17/11 | (2006.01) |
| G06N 10/00 | (2022.01) |

(52) U.S. Cl.
CPC .......... *G06F 11/3428* (2013.01); *G06F 17/11* (2013.01); *G06N 10/00* (2019.01)

(58) Field of Classification Search
CPC ........ G06N 10/00; G06N 20/00; G06N 5/003; G06F 17/11; G06F 11/3428; G06F 17/16;
(Continued)

(56) References Cited

U.S. PATENT DOCUMENTS

| | | | |
|---|---|---|---|
| 10,031,791 B1 | 7/2018 | Wallman | |
| 10,171,088 B1 * | 1/2019 | Kim | ............... G06N 20/00 |

(Continued)

OTHER PUBLICATIONS

Aharonov, Dorit, et al. "Fault-Tolerant Quantum Computation With Constant Error Rate", Proceedings of the 29th Annual ACM Symposium on Theory of Computing (STOC), 1997, pp. 1-63.
(Continued)

*Primary Examiner* — Mouloucoulaye Inoussa

(57) ABSTRACT

Systems and methods for estimating a property of an error in a circuit implemented on an n-qubit quantum system are provided, where the circuit comprises a gate set that comprises a first subset ($\mathbb{G}$) and a second subset ($\mathbb{H}$) of elementary gates. The first subset comprises a third subset ($\mathbb{T}$) of elementary gates each of which consists of an n-fold tensor product of a plurality of single qubit gates. A first procedure is executed that comprises preparing the system in a state $\psi$ and then applying $D_1=T_1$ to the system. The procedure further comprises, for each respective clock cycle t in clock cycles $t \in \{2, \ldots, m+1\}$, (a) applying H to the system, where H is an elementary gate in the second subset, and then (b) applying a gate $D_t = T_t GHT_{t-1}^\dagger H^\dagger$ to the system, where $D_t$ is an element of the first subset. The procedure further comprises performing a measurement readout R. The procedure is repeated for one or more values of $\vec{T}$ or one or more states $\psi$ or one or more measurement readout procedures R, where m is a positive integer greater than 1, G is an element of the first subset of elementary gates, $\vec{T} = (T_1, \ldots, T_m, T_{m+1}=I)$, and $T_1, \ldots, T_m$ are elements of $\mathbb{T}$, with the proviso that n>2.

26 Claims, 5 Drawing Sheets

(58) Field of Classification Search
CPC ............... G06F 30/327; G06F 11/004; G06F 9/45508; G06F 15/80; G06F 17/10; B82Y 10/00; H03K 19/195; H03K 19/20; H03M 13/29; H01L 39/221; H01L 27/18
See application file for complete search history.

(56) References Cited

U.S. PATENT DOCUMENTS

| | | | | |
|---|---|---|---|---|
| 2003/0055513 | A1* | 3/2003 | Raussendorf .......... | B82Y 10/00 700/1 |
| 2005/0224784 | A1* | 10/2005 | Amin ..................... | B82Y 10/00 257/14 |
| 2007/0162262 | A1* | 7/2007 | Tucci ..................... | B82Y 10/00 703/1 |
| 2014/0280427 | A1* | 9/2014 | Bocharov ............... | B82Y 10/00 708/523 |
| 2017/0032272 | A1* | 2/2017 | Bocharov ............... | G06N 20/00 |
| 2017/0194930 | A1* | 7/2017 | Wiebe ..................... | G06F 7/523 |
| 2017/0308803 | A1* | 10/2017 | Wallman ............... | G06F 11/004 |
| 2017/0316336 | A1* | 11/2017 | Bocharov ............... | G06N 10/00 |
| 2018/0039903 | A1* | 2/2018 | Mosca ................... | B82Y 10/00 |
| 2018/0046933 | A1* | 2/2018 | La Cour ................. | G06N 10/00 |
| 2018/0053113 | A1* | 2/2018 | Lutchyn ................. | G06N 10/00 |
| 2018/0107939 | A1* | 4/2018 | Schoennenbeck ..... | G06N 10/00 |
| 2018/0144262 | A1* | 5/2018 | Roetteler ............... | G06N 10/00 |
| 2018/0276014 | A1* | 9/2018 | Kliuchnikov ........ | G06F 9/45508 |

OTHER PUBLICATIONS

Beigi, Salman, et al. "Simplified instantaneous non-local quantum computation with applications to position-based cryptography", Institute for Quantum Information, Caltech, Sep. 20, 2011, pp. 1-18.

Carignan-Dugas, Arnaud, et al. "Characterizing Universal Gate Sets via Dihedral Benchmarking", Institute for Quantum Computing and the Department of Applied Mathematics, University of Waterloo, Jul. 26, 2018, pp. 1-5.

Cross, Andrew W., et al. "Scalable randomized benchmarking of non-Clifford gates", IBM T.J. Watson Research Center, Oct. 8, 2015, pp. 1-9.

Dankert, Christoph, et al. "Exact and approximate unitary 2-designs and their application to fidelity estimation", Physical Review, David R. Cheriton School of Computer Science and Institute for Quantum Computing, University of Waterloo, Jul. 6, 2009, pp. 1-6.

Emerson, Joseph, et al. "Scalable Noise Estimation with Random Unitary Operators", Perimeter Institute for Theoretical Physics, Mar. 24, 2005, pp. 1-8.

Emerson, Joseph, et al. "Symmetrized Characterization of Noisy Quantum Processes", www.sciencemag.org, Science, vol. 317, Sep. 28, 2007, pp. 1893-1897.

Flammia, Steven T., et al. "Direct Fidelity Estimation from Few Pauli Measurements", Institute for Quantum Information, Apr. 29, 2011, pp. 1-9.

Hoeffding, Wassily, "Probability Inequalities for Sums of Bounded Random Variables", Journal of the American Statistical Association, Apr. 10, 2012, pp. 1-19.

Holevo, A.S., "Additivity Conjecture and Covariant Channels", International Journal of Quantum Information, vol. 3, No. 1, 2005, pp. 41-47.

Knill, E., et al. "Randomized Benchmarking of Quantum Gates", National Institute of Standards and Technology, May 28, 2018, pp. 1-13.

Lévi, Benjamin, et al. "Efficient error characterization in Quantum Information Processing", Department of Nuclear Science and Engineering, Jul. 20, 2018, pp. 1-11.

Magesan, Easwar, et al. "Scalable and Robust Randomized Benchmarking of Quantum Processes", Physical Review Letters, Institute for Quantum Computing and Department of Applied Mathematics, University of Waterloo, May 6, 2011, pp. 1-4.

Magesan, Easwar, et al. "Characterizing Quantum Gates via Randomized Benchmarking", Department of Applied Mathematics, University of Waterloo, Apr. 27, 2012, pp. 1-19.

Magesan, Easwar, et al. "Efficient measurement of quantum gate error by interleaved randomized benchmarking", Department of Applied Mathematics, University of Waterloo, Mar. 19, 2014, pp. 1-5.

Nielsen, Michael A., "A simple formula for the average gate fidelity of a quantum dynamical operation", Centre for Quantum Computer Technology and Department of Physics, University of Queensland, Feb. 1, 2008, pp. 1-3.

Sanders, Yuval R., et al. "Bounding quantum gate error rate based on reported average fidelity", Institute for Quantum Computing, University of Waterloo, Dec. 27, 2015, pp. 1-22.

Wallman, Joel, J., et al. "Randomized Benchmarking with Confidence", Institute for Quantum Computing, University of Waterloo, Dec. 18, 2015, pp. 1-31.

Wallman, Joel, J., et al. "Estimating the Coherence of Noise", Institute for Quantum Computing and Department of Applied Mathematics, University of Waterloo, Aug. 25, 2015, pp. 1-10.

Wallman, Joel, J., et al. "Robust Characterization of Loss Rates", Institute for Quantum Computing, University of Waterloo, Waterloo, May 10, 2018, pp. 1-5.

Wallman, Joel J., et al. "Robust characterization of leakage errors", IOP Publishing, New Journal of Physics, 18, 2016, pp. 1-8.

Wallman, Joel J., et al. "Noise tailoring for scalable quantum computation via randomized compiling", Institute for Quantum Computing and Department of Applied Mathematics, University of Waterloo, Jun. 10, 2016, pp. 1-10.

Kitaev, A. Yu, "Quantum computations: algorithms and error correction", Russian Mathematical Surveys, vol. 52, No. 6, 1997, pp. 1-61.

* cited by examiner

SYSTEMS AND METHODS FOR LOCAL RANDOMIZED BENCHMARKING

CROSS REFERENCE TO RELATED APPLICATION

This application claims priority to U.S. Provisional Patent Application No. 62/535,953 entitled "Systems and Methods for Local Randomized Benchmarking," filed Jul. 23, 2017, which is hereby incorporated by reference."

TECHNICAL FIELD

The disclosed implementations relate generally to scalable systems and methods for characterizing the noise in multi-qubit quantum information processes which can be realized in some embodiments using only single-qubit randomizing gates. This enables scalable and precise estimates of one or more properties of the errors in individual gates, compositions of gates over qubits, compositions of gates in time, including entire circuits, under very general conditions and without requiring assumptions such as locality of the noise across qubits (e.g., negligible or short-range noise correlations).

BACKGROUND

Achieving the advantages of quantum computing requires overcoming the limitations imposed by a variety of error sources including noise (such as decoherence from the environment) and the finite-precision of control (which leads to coherent errors). A conventional approach to this challenge includes optimizing the design of hardware and control methods to reduce these error sources and, if possible, apply methods of error-correction during run-time to overcome residual errors. Both of these tasks require methods for identifying relevant features of the noise, such as the type and strength of the various error mechanisms. Error characterization is also relevant to determining or bounding the correctness of the ultimate output of a quantum information processor when running a particular algorithm or other computational task.

Completely characterizing quantum noise processes requires both an exponential amount of experiments and an exponential amount of classical computational resources. Such resources are unavailable for quantum systems comprising even a modest number of qubits (due to the exponential growth of Hilbert space) and in general requiring such resources can undermine the very potential of achieving an exponential reduction relative to the required classical computational resources for a computational problem of interest.

However, noise processes can be partially characterized by studying the performance of random circuits subject to some constraint, as in randomized benchmarking (RB) [1-5] and variants thereof [6-12]. Randomized benchmarking estimates the average gate fidelity of the average noise $\varepsilon$ to the identity, which can be written as [13, 14]

$$f(\varepsilon) = \frac{1}{d+1} + \frac{d}{d+1} \mathbb{E}_{P \in \mathbb{P}^n}[f_P(\varepsilon)], \quad (1)$$

where $\mathbb{E}_{x \in X}[f(x)] = |X|^{-1} \sum_{x \in X} f(x)$ denotes the uniform average over $X$, $\mathbb{P}^n$ is the (projective) n-qubit Pauli group, and the Pauli-fidelities of $\varepsilon$ are $$f_P(\varepsilon) = Tr[P\varepsilon(P)]/d. \quad (2)$$

For any trace-preserving channel, $f_I(\varepsilon) = 1$ and so we will generally ignore $f_I(\varepsilon)$.

Conventional techniques generally randomize over uniformly random Clifford gates, which require circuits with $O(n^2)$ primitive gates. Consequently, attempting to estimate error rates on individual primitive gates will result in a rather large uncertainty. In principle, interleaved RB can be used to estimate the errors in individual gates [7], however, the systematic uncertainties from interleaved RB are generically quite large, and the precision with which the error of the individual gate can be estimated will be limited by the rapid decay due to the long random Clifford gates.

SUMMARY

The present disclosure provides scalable characterization techniques and systems for providing scalable characterization. Advantageously, in some embodiments the disclosed scalable characterization uses only single-qubit randomizing gates.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
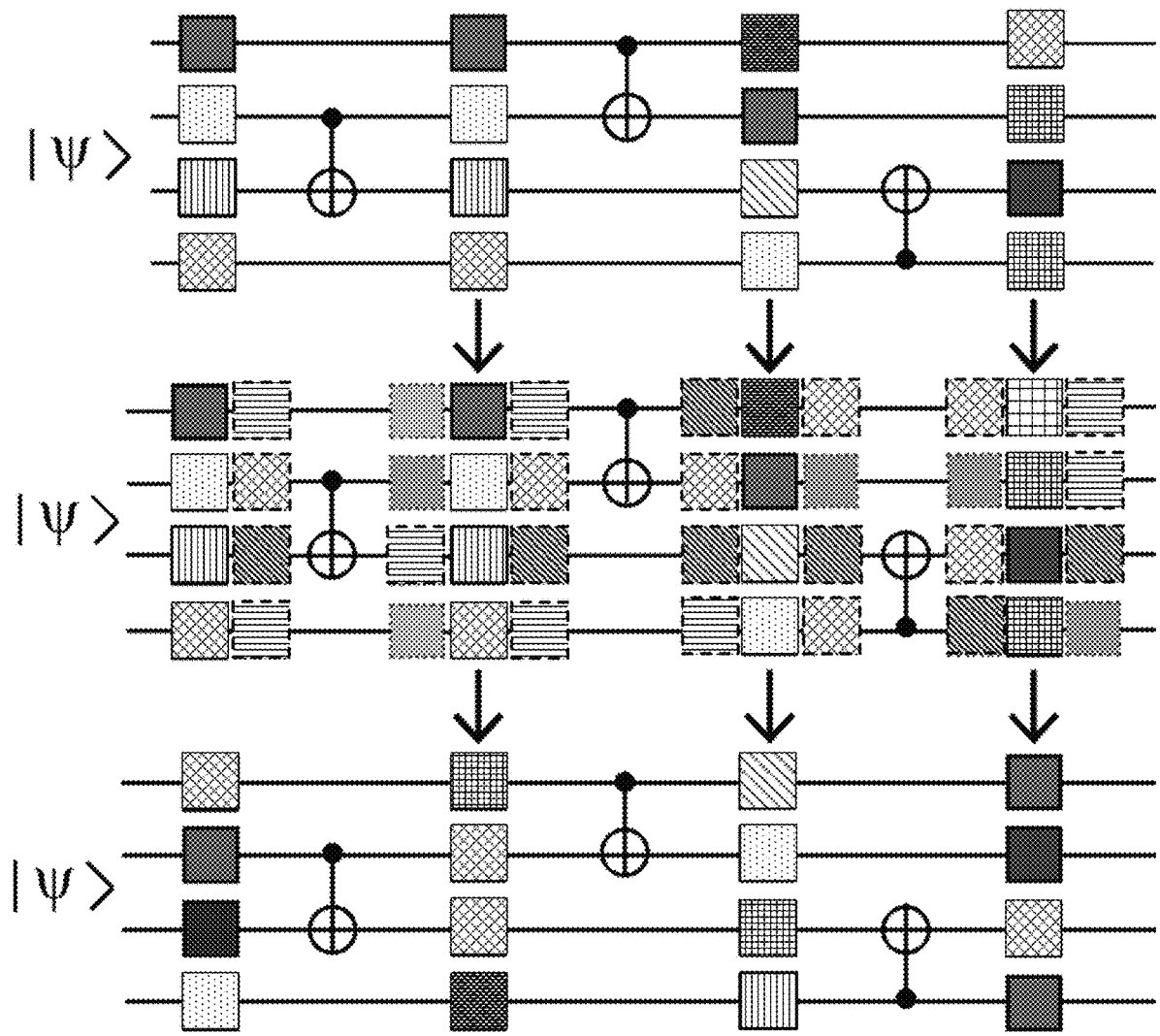
FIG. 1 (top) illustrates a bare circuit that is arranged into cycles wherein each cycle consists of a round of easy single-qubit gates and a round of hard gates (here, the hard gates are controlled-NOT gates), (middle) a randomized circuit wherein virtual twirling gates are incorporated into all easy gates, and (bottom) a randomized circuit wherein the twirling gates have been compiled into the easy gates, resulting in a new circuit that is logically equivalent to the bare circuit, in which time flows from right to left, in accordance with an embodiment of the present disclosure.

We begin by discussing how error rates in a quantum circuit can be quantified. We then discuss how our protocol can be utilized to characterize the noise in a universal set of quantum gates.

The "error rate" due to an arbitrary noise map $\varepsilon$ can be quantified in a variety of ways. Two particularly important quantities are the average error rate defined via the gate fidelity $$r(\varepsilon) = 1 - \int d\psi \langle \psi | \varepsilon(|\psi\rangle \langle \psi|) | \psi \rangle \quad (3)$$

and the worst-case error rate (also known as the diamond distance from the identity) [19]

$$\epsilon(\varepsilon) = \frac{1}{2}\|\varepsilon - \mathcal{I}\|_\diamond = \sup_\psi \frac{1}{2}\|[\varepsilon \otimes \mathcal{I}_d - \mathcal{I}_{d^2}](\psi)\|_1 \quad (4)$$

where d is the dimension of the system ε acts on, $\|A\|_1 = \sqrt{\text{Tr}A^\dagger A}$ and the maximization is over all $d^2$-dimensional pure states (to account for the error introduced when acting on entangled states). The average error rate r(ε) is an experimentally-convenient characterization of the error rate because it can be efficiently estimated via randomized benchmarking [1, 3-6]. However, the diamond distance is typically the quantity used to prove rigorous fault-tolerance thresholds. See Dorit Aharonov and Michael Ben-Or, Fault-Tolerant Quantum Computation With Constant Error Rate, SIAM J. Comput. 38, 1207 (1999), which is hereby incorporated by reference. The average error rate and the worst-case error rate are related via the bounds [20, 21]

$$r(\varepsilon)d^{-1}(d+1) \leq \epsilon(\varepsilon) \leq \sqrt{r(\varepsilon)}\sqrt{d(d+1)}. \quad (5)$$

The lower bound is saturated by any stochastic Pauli noise, in which case the worst-case error rate is effectively equivalent to the experimental estimates obtained efficiently via randomized benchmarking. See Easwar Magesan, Jay M. Gambetta, and Joseph Emerson, Scalable and Robust Randomized Benchmarking of Quantum Processes, Phys. Rev. Lett. 106, 180504 (2011), which is hereby incorporated by reference. While the upper bound is not known to be tight, there exist unitary channels such that $\epsilon(\varepsilon) \approx \sqrt{(d+1)r(\varepsilon)/4}$, so the scaling with r is optimal. See Yuval R Sanders, Joel J. Wallman, and Barry C. Sanders, Bounding quantum gate error rate based on reported average fidelity, New J. Phys. 18, 012002 (2015), which is hereby incorporated by reference.

Notation.

Quantum channels, denoted herein by calligraphic font (e.g., $\mathcal{C}$), are maps from quantum states to quantum states. Of typical interest in the present disclosure is Pauli noise, that is, quantum channels $\mathcal{C}$ such that $$\mathcal{C}(P) = f_P(\mathcal{C})P \quad (6)$$

for all Pauli matrices $P \in \mathbb{P}^n$.

Channel composition is denoted by (noncommutative) multiplication (i.e., $\mathcal{C}\mathcal{B}(A) = \mathcal{C}[\mathcal{B}(A)]$). As the present disclosure considers products of many quantum channels, the short hand $$x_{b:a} = \begin{cases} x_b x_{b-1} \ldots x_{a+1} x_a & b \geq a, \\ 1 & \text{otherwise} \end{cases} \quad (7)$$

is adopted herein for noncommutative products of subscripted objects. Moreover, as certain embodiments of the present disclosure consider multiple averages, uniform averages are denoted by $\mathbb{E}_{x \in X}[f(x)] = |X|^{-1}\Sigma_{x \in X}f(x)$.

The following concepts from group theory are used herein in the construction and proof of a protocol in accordance with an embodiment of the present disclosure. The order ord(g) of a group element $g \in \mathbb{G}$ is the smallest integer a such that $g^a = 1_\mathbb{G}$, where $1_\mathbb{G}$ is the identity element of $\mathbb{G}$. The centralizer of a set $\mathbb{S} \subseteq \mathbb{G}$ in a group $\mathbb{G}$ is the group $$\mathbb{S}(\mathbb{S}) = \{G \in \mathbb{G} : GSG^\dagger = S \forall S \in \mathbb{S}\}. \quad (8)$$

Randomized Compiling.

The randomized compiling protocol, which can convert the noise in universal quantum circuits into Pauli noise [15], is now reviewed. Note that any gate in the following can be a multi-qubit gate or a tensor product of gates acting on subsystems.

Suppose elementary gates can be divided into an 'easy' group and a 'hard' set $\mathbb{H}$ such that $\mathbb{G}$ contains a subset $\mathbb{T}$ that is a unitary 1-design [4]. Here the descriptors 'easy' and 'hard' gates do not define necessary properties of these gates—rather the descriptors are drawn from certain features of these gates as they will occur in some embodiments. The easy and hard gates together can form a gate set that enables universal quantum computation. Any circuit of elementary gates can then be recompiled into a 'bare' circuit of alternating rounds of easy and hard gates as illustrated in FIG. 1, where the assumption is made without loss of generality that the first and last rounds of gates are easy gates.

Randomized compiling consists of compiling random elements of $\mathbb{T}$ before and after each easy gate to produce a logically equivalent randomized circuit as in FIG. 1 (middle and bottom) as follows. Let $G_m$ and $H_m$ be the mth easy and hard gate rounds in the bare circuit. Each value of in is called a cycle or clock cycle (e.g., the composition $H_m G_m$ is the $m^{th}$ "clock cycle" or "cycle"). Then $G_m$ is replaced with the dressed gate $$D_m = T_m G_m T_{m-1}^c, \quad (9)$$

where $T_0 = T_M = I$ and $T_m \in \mathbb{T}$ is chosen uniformly at random for $m = 1, \ldots, M-1$ and $T_m^c = H_m T_m^\dagger H_m^\dagger$. For any circuit with M rounds of hard gates and any $T_m \in \mathbb{T}$, $$D_{M+1}\prod_{m=1}^{M} H_m D_m = G_{M+1}\prod_{m=1}^{M} H_m G_m. \quad (10)$$

To allow the correction gates to be compiled into the dressed gates so that they can be implemented as a single round of easy gates, we require $T_m^c \in \mathbb{G}$ for all $T_m \in \mathbb{T}$.

Cycle Benchmarking.

We now describe a protocol for estimating one or more features of the composite error in a given cycle of a quantum circuit. As above, we denote the hard gate or hard gates in the cycle by H (in other words H may refer to one hard gate or a tensor product of hard gates—that is, a round of parallel hard gates in a cycle). Similarly the easy gate or easy gates refers to an easy gate round which may consist of a tensor product of easy gates applied in parallel. For simplicity, we will assume that the noise on the easy gates is gate-independent, so that $\mathcal{G} = \mathcal{A}\mathcal{G}$ for some fixed noise process $\mathcal{A}$ (where calligraphic font $\mathcal{G}$ here refers to the superoperator form of the channel G) and the noise in the cycle of the quantum circuit is $\varepsilon = \mathcal{H}^\dagger \mathcal{H} \mathcal{A}$, while the tailored noise in the cycle of the quantum circuit implemented by randomized compiling is [15]

$$\mathcal{T} = \mathbb{E}_{T \in \mathbb{T}}[\mathcal{T}^\dagger{}_\varepsilon \mathcal{T}], \quad (11)$$

which is a Pauli noise channel whenever $\mathbb{T}$ is a unitary 1-design. As the fidelity of a quantum channel to the identity and expectation values are linear functions, $f(\mathcal{T}) = f(\varepsilon)$, so that in what follows $f(\mathcal{T})$ is a feature of the composite error in a given cycle of a quantum circuit implemented either with or without randomized compiling.

An application of the protocol, in accordance with a special case preferred embodiment of the present disclosure, is to consider a set of bare circuits where each element of this set is comprised of m repetitions of a given cycle (e.g. from a quantum circuit of interest) in order to systematically amplify and estimate the error associated with that cycle. As we assume the noise on the easy gates is gate-independent, we can set the easy gate in the cycle to the identity, that is, $G_m=I$ and $H_m=H$. However, under gate-dependent noise on the easy gates, the easy gate G would be left unchanged, so that the bare circuit would be $(HG)^m$. The effective circuit (e.g., with $G_m=I$) under randomized compiling is then $(\mathcal{H}\mathcal{T})^m$.

To further simplify the effective circuit, let $$\mathcal{T}_j = \mathcal{H}^{-j}\mathcal{T}\mathcal{H}^j, \tag{12}$$

and m be such that $H^m=I$, so that $$(\mathcal{H}\mathcal{T})^m = [(\mathcal{H}\mathcal{T})^{ord(H)}]^{m/ord(H)} \tag{13}$$

$$= [\mathcal{H}^{ord(H)}\mathcal{T}_{ord(H)-1:0}]^{m/ord(H)}$$

$$= \mathcal{T}_{ord(H)-1:0}^{m/ord(H)}$$

where the second equality follows from a straightforward induction. Therefore, whenever the gates are chosen so that $\mathcal{T}_j$ is a Pauli channel for any integer j, the effective circuit is also a Pauli channel.

In order to estimate the Pauli-fidelities $f_P(\mathcal{T}_{ord(H)-1:0})$ for any fixed $P \in \mathbb{P}^n$, we can prepare a state $\psi_P$ such that $$P\psi_P = \psi_P, \tag{14}$$

apply the circuit and then perform a measurement procedure $R_P$ such that the expectation value of P can be inferred from the output of $R_P$. In some embodiments, $R_P$ comprises a circuit that maps P to a specific observable Q (e.g., the energy observable of the system or a subsystem thereof) and then a readout of the expectation value of Q. In some embodiments, $R_P$ comprises a circuit that maps P to an observable Q diagonalized by a known basis (e.g., the energy eigenbasis of a system), followed by a projective measurement in the known basis. In embodiments of the latter form, the expectation value of P can be inferred from one or more readouts by calculating relative frequencies $\omega(\eta)$ of the system being measured to be in the eigenspace of Q with eigenvalue $\eta$ and setting the expectation value of P to $\Sigma_\eta \eta \omega(\omega)$. The expectation value of P will be $$Tr[P\mathcal{T}_{ord(H)-1:0}^{m/ord(H)}(\psi_P)] = c_P f_P(\mathcal{T})^{m/ord(H)} \tag{15}$$

where we have expanded $\psi_P = \Sigma_{Q \in \mathbb{P}^n} c_Q Q$ and used eq. (6) and the orthonormality of Pauli matrices. A state $\psi_P$ can be prepared by preparing the computational basis state $|0\rangle^{\otimes n}$ and applying $B_{P_j}$ to each qubit $j \in \mathbb{Z}_n$ where $$B_I = B_Z = I, B_X = \sqrt{Y}, B_Y = \sqrt{X}. \tag{16}$$

However, state-preparation and measurement (SPAM) errors will cause the decay to deviate from a pure exponential, picking up both constant terms and other exponential decay terms. To make the above robust to SPAM errors, assuming that $\mathbb{P}^n \subseteq \mathbb{G}$, we can add additional random Pauli gates into the circuit and also run the protocol for a state $\psi_{-P}$ such that $P\psi_{-P} = \psi_{-P}$. The additional Pauli gates can be inserted anywhere in the circuit with appropriate modifications, but for concreteness, we compile uniformly random gates $P' \in C_\mathbb{P}$ into the first gate. A state $\psi_{-P}$ can be prepared from the computational basis state $|0\rangle^{\otimes n}$ by replacing $B_j$ with $B_j X$ for the first j such that $P_j \neq I$ in the procedure for preparing $\psi_P$.

The effective circuit is then $$\mathcal{T}_{ord(H)-1:0}^{m/ord(H)} \mathbb{E}(\mathcal{P}') \tag{17}$$

where the noise is unchanged under the assumption that the noise is independent of the easy gate.

Let $\rho_{\mu P}$ and $\tilde{R}_P$ be the noisy implementations of $\psi_{\mu P}$ and $R_P$ respectively and $\tilde{P}$ be the observable that can be inferred from $\tilde{R}_P$ (assuming perfect knowledge of $\tilde{R}_P$. By lemma 1 and eq. (6), and the linearity of the trace, $$Tr\left[\tilde{P}\mathcal{T}_{ord(H)-1:0}^{m/ord(H)}\mathbb{E}_{P' \in C_{\mathbb{P}^n}(P)}(\mathcal{P}')(\rho_{\mu P})\right] = Tr\left[\tilde{P}\mathcal{T}_{ord(H)-1:0}^{m/ord(H)}(I/d + c_\mu \mu P)\right] \tag{18}$$

$$= Tr[\tilde{P}]/d + c_\mu \mu Tr\left[\tilde{P}\mathcal{T}_{ord(H)-1:0}^{m/ord(H)}(P)\right]$$

$$= Tr[\tilde{P}]/d + c_\mu \mu f_P(\mathcal{T}_{ord(H)-1:0})^{m/ord(H)} Tr[\tilde{P}P]$$

$$=: A_P + \mu B_{\mu P} f_P(\mathcal{T}_{ord(H)-1:0})^{m/ord(H)},$$

where we have assumed the noise is trace-preserving.

Lemma 1.

For any n-qubit Pauli matrix P and any quantum state $\rho$, $$\mathbb{E}[\mathcal{P}'(\rho)] = I/d + Tr[P_\rho]P/d \tag{19}$$

Proof.

As $C_\mathbb{P}(P)$ is a subgroup of the Pauli group, either all or half of the elements of $C_\mathbb{P}(P)$ commute with any fixed $Q \in \mathbb{P}^n$.

For any $Q \neq P, I$, there exists at least one element of $C_\mathbb{P}(P)$ that anticommutes with Q. To see this, suppose there exists some j such that $Q_j \neq P_j, I$ and let $Q' \in \mathbb{P}^n$ be such that $Q'_k = \delta_{j,k}A + (1-\delta_{j,k})I$ for some A that commutes with $P_j$ and anticommutes with $Q_j$. Then $Q' \in C_\mathbb{P}(P)$ and anticommutes with Q. Otherwise, since $Q \neq P, I$, there exist distinct j and k such that $Q_j = I$ and $P_j \neq I$ and $Q_k = P_k \neq I$. Let $Q'_l = I$ for $l \neq j, k$ and $Q'_j$ and $Q'_k$ anticommute with $P_j$ and $P_k$ respectively. Then $Q' \in C_\mathbb{P}(P)$ and anticommutes with Q.

Now let $\eta(A, B) = 1$ if $[A,B]=0$ and $\eta(A,B)=-1$ otherwise. Then $$\mathbb{E}_{P' \in C_{\mathbb{P}^n}(P)}[\mathcal{P}'(Q)] = \mathbb{E}_{P' \in C_{\mathbb{P}^n}(P)}[P'QP'] \tag{20}$$

$$= \mathbb{E}_{P' \in C_{\mathbb{P}^n}(P)}[\eta(Q, P')]Q,$$

which is zero unless $Q = I, P$. Expanding $p = \Sigma_{Q \in \mathbb{P}^n} Tr(Q\rho)/dQ$ and using the linearity of quantum channels completes the proof, where $Tr(\eta) = 1$ for any quantum state.

Figure 2:
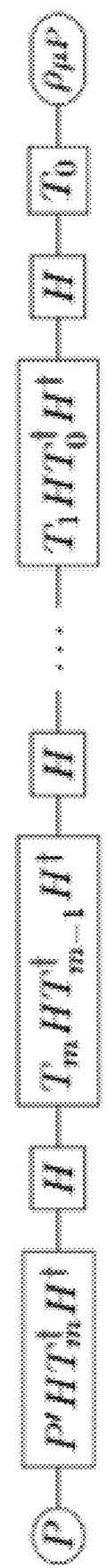
FIG. 2 illustrates a protocol in which time flows from right to left in accordance with an embodiment of the present disclosure.
Figure 3:
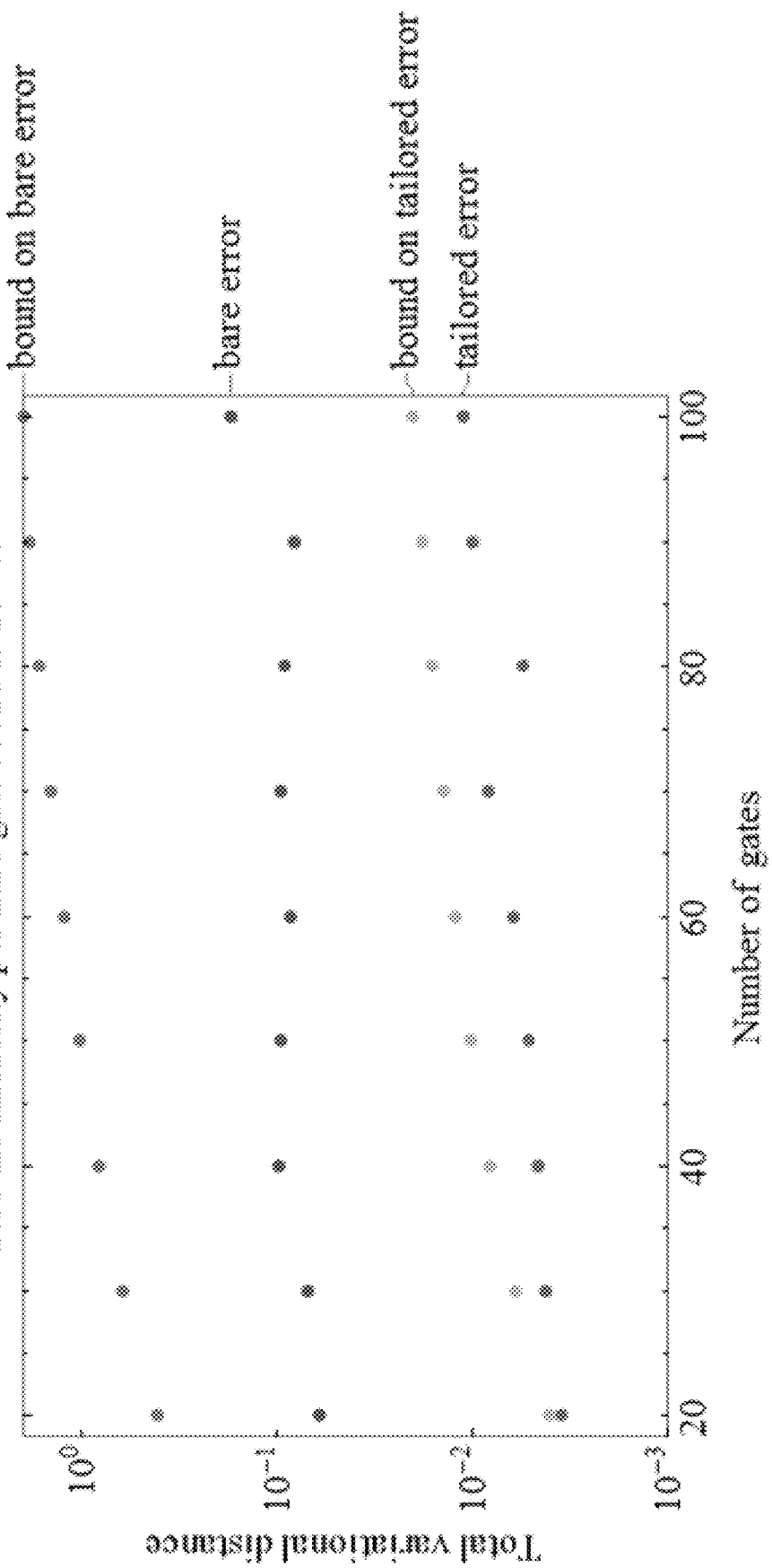
FIG. 3 illustrates a numerical simulation of a 4-qubit system with a prescribed error model associated with an error rate per cycle of 0.0001 in accordance with an embodiment of the present disclosure.
Figure 4:
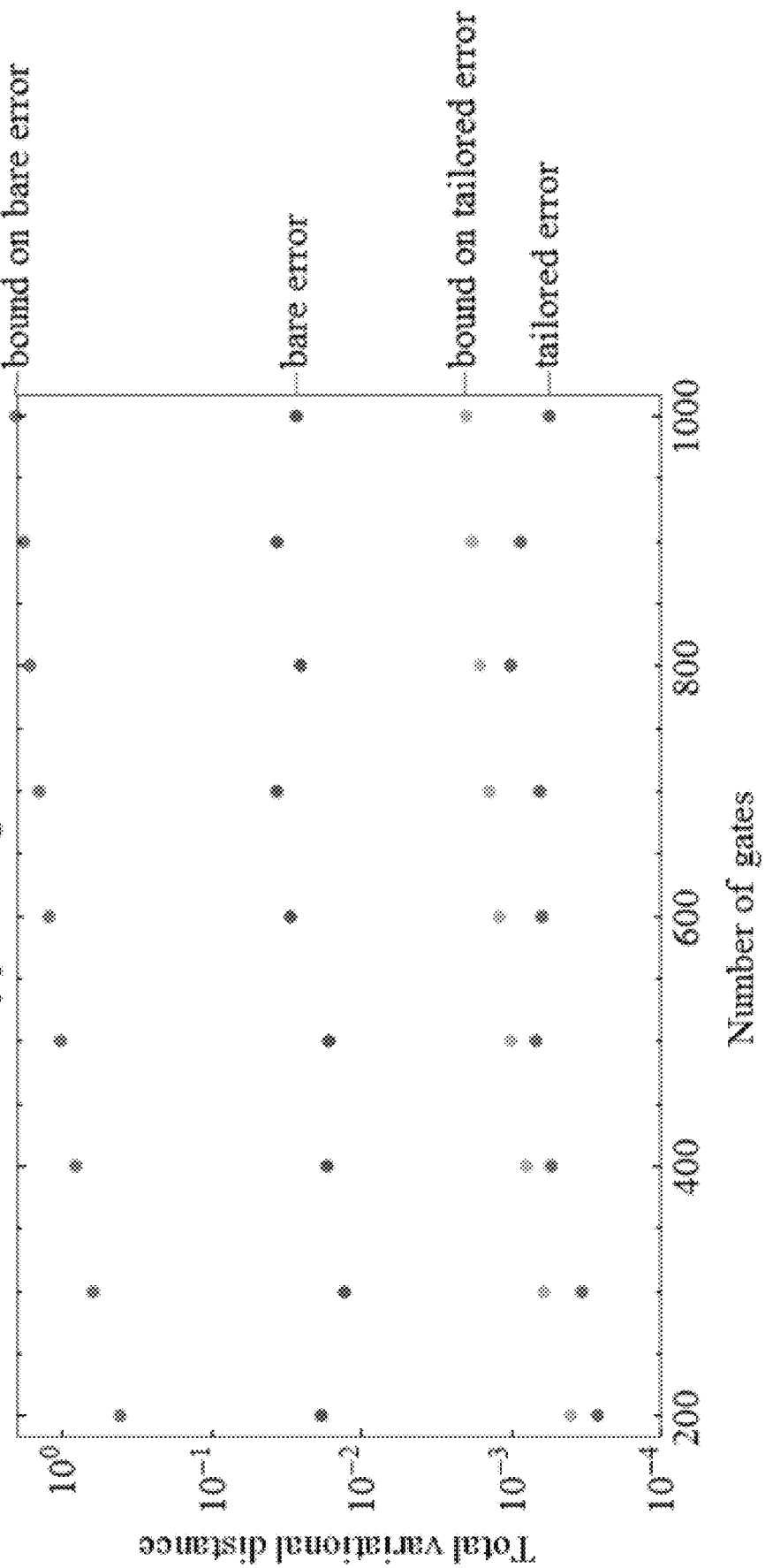
FIG. 4 illustrates the same simulation as FIG. 3 but with a prescribed error model associated with an error rate per cycle of 0.000001, in accordance with an embodiment of the present disclosure.

Let m be an integer multiple of ord(H), $\mu \in \{\pm\}$, $P' \in C_\mathbb{P}(P)$, $\vec{T} = (T_1, \ldots, T_m) \in \mathbb{T}^m$ and $P(\mu, \vec{T}, P')$ be the inferred expectation value of the following circuit, illustrated in FIG. 2.

Prepare the quantum system in a state $\psi_{\mu P}$.
Apply $D_1=T_1/P'$ to the quantum system
For each respective clock cycle $t \in \{2, \ldots, m+1\}$
  1. apply H to the quantum system, and then
  2. apply $D_t = T_t G H T_{t-1}^\dagger H^\dagger \in \mathbb{G}$ to the quantum system, wherein $T_{m+1}=I$.
Measure $R_P$.
Any Pauli-fidelity $f_P(\mathcal{T})$ can be estimated by repeating the above for multiple $P'$ and $\vec{T}$ to estimate $$\mathbb{E}_{\vec{T} \in \mathbb{T}^m, P' \in C_{\mathbb{P}^n}(P)} [P(\mu, \vec{T}, P')] \quad (21)$$

to a suitable precision for several integer multiples m of ord(H) and for one or both $\mu \in \{\pm\}$ and fitting to the models $$\mathbb{E}_{\vec{T} \in \mathbb{T}^m, P' \in C_{\mathbb{P}^n}(P)} [P(\mu, \vec{T}, P')] = A_\mu f_P(\mathcal{T})^{m/ord(H)} + B_P, \quad (22)$$

or, alternatively, fitting to the single model $$\sum_{\mu \in \{\pm\}} \mu \mathbb{E}_{\vec{T} \in \mathbb{T}^m, P' \in C_{\mathbb{P}^n}(P)} \left[ P(\mu, \vec{T}, P') \right] = A f_P(\mathcal{T}_{ord(H)-1:0})^{m/ord(H)}. \quad (23)$$

Repeating for multiple P and using eq. (1) enables the fidelity $f(\mathcal{T})$ to be estimated. By a standard definition of the fidelity [13], the unitary invariance of the fidelity, and the linearity of the trace and integrals, $$f(\mathcal{T}_{ord(H)-1:0}) = \int d\psi Tr[\psi \mathcal{T}_{ord(H)-1:0}(\psi)]$$

$$= 1 + \sum_{j=0}^{ord(H)-1} \int d\psi Tr[\psi(\mathcal{T}_j - I)(\psi)] +$$

$$\sum_{ord(H)>j>k\geq 0} \sum_{j=0}^{ord(H)-1} \int d\psi Tr[\psi(\mathcal{T}_j - I)(\mathcal{T}_k - I)(\psi)] + \ldots$$

$$= \sum_{j=0}^{ord(H)-1} f(\mathcal{T}_j) + 1 - ord(H) + O\left[\binom{ord(H)}{2}(1 - f[\mathcal{T}])^2\right]$$

$$= ord(H)f(\mathcal{T}) + 1 - ord(H) + O\left[\binom{ord(H)}{2}(1 - f[\mathcal{T}])^2\right]. \quad (24)$$

Therefore, provided that the higher order terms are negligible, that is, that $1 - f[\mathcal{T}] \ll ord(H)$, we can efficiently estimate the fidelity of the error per cycle in a circuit implemented via randomized compiling. Moreover, as disclosed below, very few Pauli matrices P need to be estimated in order to estimate $f(\mathcal{T}_{ord(H)-1:0})$ and hence $f(\mathcal{T})$ to a high precision.

Having estimated the fidelity, the total error in a circuit C implemented by randomized compiling due to noisy gates with tailored noise $\mathcal{T}(j)$ in the jth round is [10, 16]

$$\|C_{RC} - C_{ideal}\|_\diamond \leq \sum_j \|\mathcal{T}(j) - cI\|_\diamond \quad (25)$$

$$\leq \sum_j (1 + d^{-1})(1 - f[\mathcal{T}(j)])$$

by the triangle inequality and as $\mathcal{T}(j)$ is a Pauli channel for all j.

Benchmarking a Universal Set of Quantum Operations.

The protocol disclosed above allows Pauli fidelities to be estimated for the composition of the noise in several cycles for broad sets of quantum operations. We now show how it can be utilized for multiple n-qubit Pauli operators to efficiently estimate the fidelity per cycle for a universal gate set. In all that follows, $\mathbb{T}$ can be straightforwardly expanded to include additional Clifford gates T that commute with H.

Including T makes $f_{TPT^\dagger}=f_P$, reducing the number of distinct decay rates.

A. Clifford Operations.

Let H be an n-qubit Clifford gate and set $\mathbb{T} = \mathbb{P}^n$. For any fixed $P \in \mathbb{P}^n$, any Clifford gate H, and any integer j, $\mathcal{T}$ is a Pauli channel where $\mathcal{T}$ is as defined in eq. (12). Then $$f_P(\mathcal{T}_{ord(H)-1:0}) = Tr[P\mathcal{T}_{ord(H)-1:0}(P)]/d \quad (26)$$

$$= \prod_{j=0}^{ord(H)-1} f_P(\mathcal{T}_j)$$

$$= \prod_{j=0}^{ord(H)-1} (1 - [1 - f_P(\mathcal{T}_j)])$$

$$= 1 - \sum_{j=0}^{ord(H)-1} [1 - f_{H^j P H^{-j}}(\mathcal{T})] + O[ord(H)^2 r(\mathcal{T})^2],$$

where $r(\mathcal{T})=1-f(\mathcal{T})$ and the last line follows from eq. (36) (and the implicit constant is between 4 and 6). Therefore, to $O[\text{ord}(H)^2 r(\mathcal{T})^2]$, $$\mathbb{E}_{j \in \mathbb{Z}_{\text{ord}(H)}}[f_{H^j P H^{-j}}(\mathcal{T})] \approx 1 - \frac{1 - f_P(\mathcal{T}_{\text{ord}(H)-1:0})}{\text{ord}(H)}. \quad (27)$$

Therefore $$\mathbb{E}_{P \in \mathbb{P}^n \backslash \{I\}}[f_P(\mathcal{T})] = \mathbb{E}_{P \in \mathbb{P}^n \backslash \{I\}}(\mathbb{E}_{j \in \mathbb{Z}_{\text{ord}(H)}}[f_{H^j P H^{-j}}(\mathcal{T})]) \quad (28)$$

$$\approx 1 - \frac{1}{\text{ord}(H)} \mathbb{E}_{P \in \mathbb{P}^n \backslash \{I\}}[1 - f_P(\mathcal{T}_{\text{ord}(H)-1:0})],$$

so that the average gate fidelity can be estimated by uniformly randomly sampling $P \in \mathbb{P}^n \backslash \{I\}$, estimating $f_P(\mathcal{T}_{\text{ord}(H)-1:0})$ and hence $\mathbb{E}_{P \in \mathbb{P}^n \backslash \{I\}}[f_P(\mathcal{T})]$ via eq. (28) and substituting into eq. (1).

B. Dihedral Operations.

Whenever $\mathbb{H}$ commutes with $\mathcal{T}$, $\mathcal{T}_{\text{ord}(H)-1:0} = \mathcal{T}^{\text{ord}(H)}$ and so the above protocol can be used to directly estimate $f_P(\mathcal{T}) = f_P(\mathcal{T}_{\text{ord}(H)-1:0})^{1/\text{ord}(H)}$.

We now show how $\mathbb{T}$ can be chosen to ensure that $$H = Q(\theta) := \exp(-i\theta Q) = \cos \theta I - i \sin \theta Q. \quad (29)$$

commutes with $\mathcal{T}$ for any real $\theta$ that is not an integral multiple of $\pi/2$. Special cases of interest for the hard gates include the "magic" gate $Z(\pi/8)$, the cross-resonance gate for variable coupling strengths, and $\sqrt{CZ}$. For any Pauli P, $$HPH^\dagger = \begin{cases} P & \text{if } [P, Q] = 0 \\ \cos 2\theta P - i \sin 2\theta QP & \text{otherwise} \end{cases}, \quad (30)$$

and so $$\mathcal{H}^\dagger \mathcal{T} \mathcal{H}(P) = \begin{cases} f_P(\mathcal{T})P & \text{if } [P, Q] = 0 \\ H^\dagger [f_P(\mathcal{T})\cos 2\theta P - & \text{otherwise} \\ f_{QP}(\mathcal{T})i\sin 2\theta QP]H \end{cases} \quad (31)$$

$$= \begin{cases} f_P(\mathcal{T})P & \text{if } [P, Q] = 0 \\ [f_P(\mathcal{T})\cos^2 2\theta + f_{PQ}(\mathcal{T})\sin^2 2\theta]P + & \text{otherwise} \\ i/2 \sin 4\theta QP[f_P(\mathcal{T}) - f_{QP}(\mathcal{T})] \end{cases}$$

Therefore $\mathbb{H}$ commutes with $\mathcal{T}$ if and only if $f_P(\mathcal{T}) = f_{QP}(\mathcal{T})$ for all $P \in \mathbb{P}^n$ that anticommute with $Q$. To ensure that this is the case, we can set $\mathbb{T}$ to be the group generated by all elements of $\mathbb{P}^n$ and $P(\pi/2)$ for all $P$ that anticommute with $Q$, as all elements of $\mathbb{T}$ commute with $\mathcal{T}$ and $$\mathcal{P}(\pi/2)^\dagger \mathcal{T} \mathcal{P}(\pi/2)(P') = \begin{cases} f_{P'}(\mathcal{T})P' & \text{if } [P, P'] = 0 \\ f_{PP'}(\mathcal{T})P' & \text{otherwise} \end{cases} \quad (32)$$

by eq. (31), so that $f_{PP'}(\mathcal{T})P' = \mathcal{T}(P') = f_P(P')$.

Pauli Sampling Complexity.

We now prove that very few Pauli matrices have to be sampled to provide a good estimate of $\mathbb{E}_{P \in \mathbb{P}^n}[f_P(\mathcal{T})]$ independent of how close the noise is to the identity. For simplicity, we will ignore errors in the individual estimates of $f_P(\mathcal{T})$. We begin by proving that all $f_P(\varepsilon)$ are close to one for any channel $\varepsilon$ close to the identity. For any n-qubit Pauli matrices $P, Q \in \mathbb{P}^n$, Pauli fidelities satisfy $$f_P(\varepsilon) = Tr[P^\dagger \varepsilon(P)]/d \quad (33)$$
$$= Tr[(QPQ^\dagger)^\dagger \varepsilon(QPQ^\dagger)]/d$$
$$= Tr[PQ^\dagger \varepsilon Q(P)]/d,$$

so that $f_P(\varepsilon) = f_P(\mathbb{E}_{Q \in \mathbb{P}^n}[Q^\dagger \varepsilon Q])$. For any CPTP map $\varepsilon$, there exists a probability distribution $p(Q)$ over $\mathbb{P}_d^n$ such that [17]

$$\mathbb{E}_{Q \in \mathbb{P}^n}[Q^\dagger \varepsilon Q](A) = \sum_{R \in \mathbb{P}^n} p(R) R A R^\dagger. \quad (34)$$

By a standard formula [13], $$f(\varepsilon) = f(\mathbb{E}_{Q \in \mathbb{P}^n}[Q^\dagger \varepsilon Q]) = \frac{p(I)d + 1}{d + 1}. \quad (35)$$

Substituting eqs. (34) and (35) into eq. (2) gives $$f_P(\varepsilon) = \quad (36)$$
$$\sum_{R \in \mathbb{P}^n : [R,P]=0} 2p(R) - 1 \geq 2p(I) - 1 = 1 - 2(1-p) = 1 - 2(1+d^{-1})r[\varepsilon].$$

Therefore $1 - f_P(\mathcal{T}) \in [0, 2(1+d^{-1})r(\mathcal{T})]$ for all $P \in \mathbb{P}^n$.

By Hoeffding's inequality [18], the average $\mathbb{E}[f_P(\mathcal{T})]$ of $f_P(\mathcal{T})$ over x Pauli matrices satisfies $$Pr(|\mathbb{E}[f_P(\mathcal{T})] - \mathbb{E}[f_P(\mathcal{T})]| \geq \epsilon[1 - f_P(\mathcal{T})]) \leq 2 \exp(-x\epsilon^2/2(1+d^{-1})^2). \quad (37)$$

For example, to get a 66% confidence interval of width $0.5[1-f_P(\mathcal{T})]$, only 20 Pauli matrices need to be sampled for any dimension and any value of $1-f_P(\mathcal{T})$. A similar calculation holds for $\mathbb{E}_{j \in \mathbb{Z}_{\text{ord}(H)}}[f_{H^j P H^{-j}}(\mathcal{T})]$.

Figure 5:
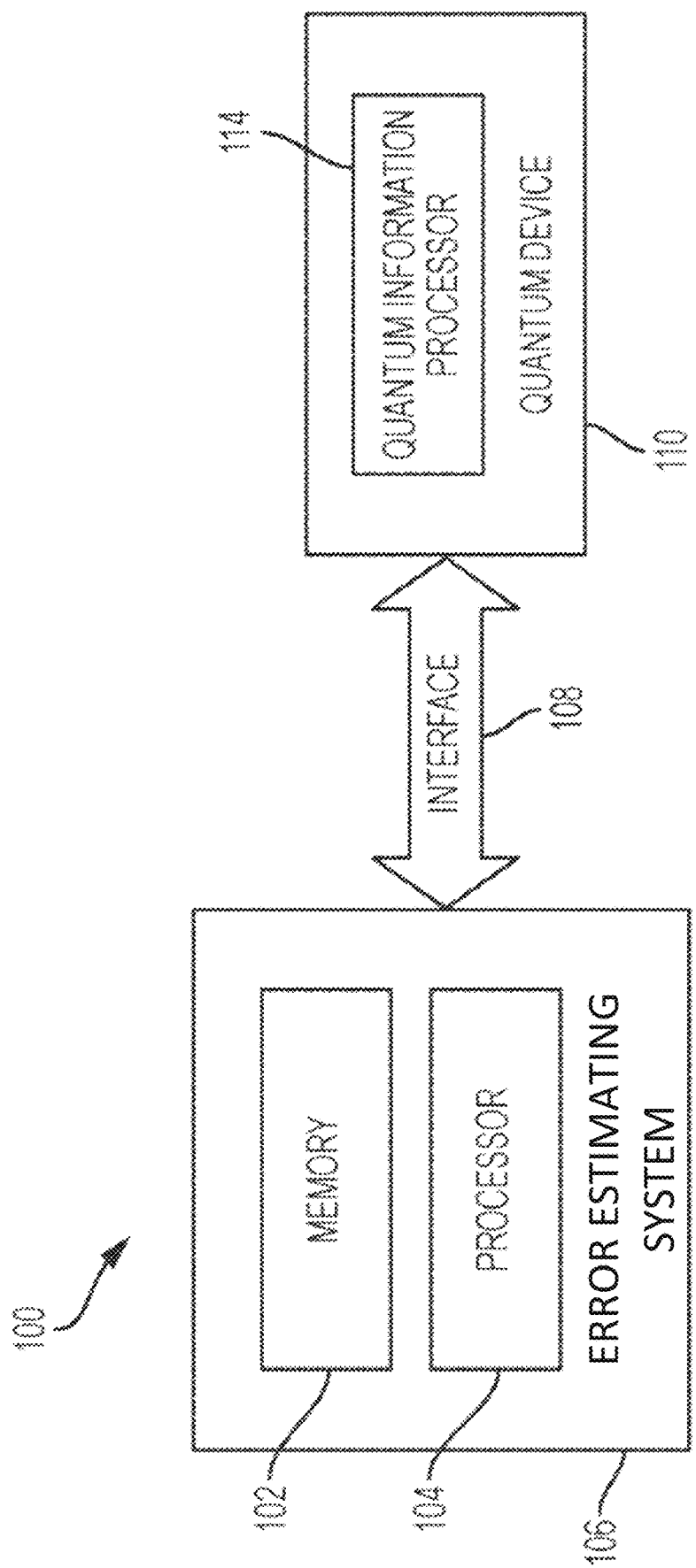
FIG. 5 illustrates a schematic diagram showing aspects of an example system in accordance with an embodiment of the present disclosure.

FIG. 5 is a schematic diagram showing aspects of an example system 100 that includes an error estimating system 106, a quantum device 110 and an interface 108. The quantum device 110 includes a quantum information processor 114. The interface 108 provides communication between the error estimating system 106 and the quantum device 110. The system 100 may include additional or different features, and the components of the system 100 may be configured to operate as discussed with respect to FIG. 5 or in another manner.

The example error estimating system 106 has computational resources (e.g., hardware, software, firmware) that are used to produce executable instructions (e.g., machine code) for the quantum device 110. In some implementations, the error estimating system 106 can be implemented as a classical computer system, such as, for example, a laptop computer, a desktop computer, a computer workstation, a server, a server cluster, a mainframe, or another type of classical computer system. As shown in FIG. 5, the example error estimating system 106 includes a memory 102 and a processor 104. The error estimating system 106 may include other components, and may be configured to operate in another manner.

In some instances, the memory 102 of the error estimating system 106 stores quantum-logic source code to be executed by the quantum information processor 114. For instance, the quantum-logic source code may be stored as quantum-logic gate sequences, quantum-logic circuits, quantum algorithms or other representations of quantum-logic. In some instances, the processor 104 of the error estimating system 106 converts the quantum-logic source code into machine code that can be executed by the quantum information processor 114. For instance, the machine code may be stored as a pulse sequence (e.g., radio frequency, microwave frequency, optical frequency), a pulse program, or another type of control sequence configured for execution by the quantum information processor 114. The machine code can be stored on the memory 102 of the error estimating system 106, transferred to the quantum device 110 via the interface 108, or handled in another manner.

The example memory 102 can include, for example, random access memory (RAM), a storage device (e.g., a writable read-only memory (ROM) or others), a hard disk, or another type of storage medium. The example memory 102 can store instructions (e.g., computer code, a computer program, etc.) associated with an operating system, computer applications and other resources. The memory 102 can also store application data and data objects that can be interpreted by one or more applications or virtual machines running on the error estimating system 106. In some cases, the memory 102 stores computer-readable instructions for software applications, scripts, programs, functions, executables or other modules that are executed by the processor 104. For example, the computer-readable instructions may be configured to perform one or more of the methods described in the present disclosure.

The example processor 104 can execute instructions, for example, to generate output data based on data inputs. For example, the processor 104 can run computer programs by executing the software, scripts, programs, functions, executables, or other modules stored in the memory 102. In some instances, the processor 104 may perform one or more of the methods described in the present disclosure. The example processor 104 shown in FIG. 1 can include one or more chips or chipsets that include analog circuitry, digital circuitry or a combination thereof. In some cases, the processor 104 includes multiple processor devices such as, for example, one or more main processors and one or more co-processors.

In some aspects of operation, the compiler system 106 obtains quantum-logic source code (e.g., a quantum-logic gate sequence, a quantum-logic circuit, a quantum algorithm, etc.), modifies the quantum-logic source code, and provides the modified quantum-logic source code to the quantum device 110 for execution by the quantum information processor 114. For instance, the quantum-logic source code can be modified to reduce the effects of noise in the quantum information processor 114. The error estimating system 106 may compile portions (e.g., one or more clock cycles) of the quantum-logic source code on-the-fly while the quantum information processor 114 executes earlier-compiled portions (e.g., earlier clock cycles). For instance, each cycle of the modified quantum-logic source code may be provided to the quantum device 110 individually. The compiler system 106 may pre-compile the quantum-logic source code before the quantum information processor 114 begins execution. For instance, all cycles of the modified quantum-logic source code may be provided to the quantum device 110 together. The error estimating system 106 may operate in another manner.

The example quantum device 110 can be a quantum computer, a quantum sensor, a quantum system, a quantum repeater or another type of device that operates using a quantum information processor. For example, the quantum device 110 may be a universal quantum computer that operates in a fault-tolerant regime and can be programmed and reprogrammed to perform computations. As another example, the quantum device 110 may be a quantum repeater that performs quantum error correction in an optical network used for quantum key distribution scheme. As another example, the quantum device 110 can be a quantum sensor that can measure physical properties of an external system based on quantum interactions or phenomena.

The example quantum information processor 114 can store quantum information in a Hilbert space defined by a quantum system. The quantum information processor 114 can store any suitable number of qubits (i.e., quantum bits), and the Hilbert space can be any suitable size. For example, the quantum information processor 114 can store n qubits in a 2n-dimensional Hilbert space. The quantum information processor 114 can perform quantum computing operations that manipulate the quantum information in the Hilbert space. For example, the quantum information processor 114 may coherently control the quantum system and preserve the relative phases of the qubits. If the quantum information processor 114 is a universal quantum computer, it can generally create any coherent state in the Hilbert space. The quantum information processor 114 can be configured to measure the state of the quantum system in a suitable basis. For example, the quantum information processor 114 may be configured to measure one or more of the qubits in a computational basis.

The quantum information processor 114 may be subject to noise that can create errors. The noise can include, for example, coherent noise processes, incoherent noise processes, or decoherent noise processes. In some cases, the quantum information processor 114 can perform a quantum error correction process that effectively counteracts the noise. In some cases, the error estimating system 106 can modify quantum-logic source code to tailor the noise affecting the quantum information processor 114. For example, the error estimating system 106 can convert an arbitrary noise process into stochastic Pauli noise in some instances. In some embodiments the compiler system 106 does this using any of the techniques disclosed in U.S. patent application Ser. No. 15/882,300, entitled "Systems and Methods for Quantum Computation Using Random Compiling," filed: Jan. 29, 2018, which is hereby incorporated by reference.

The quantum information processor 114 may be subject to noise that can create errors. The noise can include, for example, coherent noise processes, incoherent noise processes, or decoherent noise processes. In some cases, the quantum information processor 114 can perform a quantum error correction process that effectively counteracts the noise. In some cases, the error estimating system 106 can modify quantum-logic source code to tailor the noise affecting the quantum information processor 114. For example, the error estimating system 106 can convert an arbitrary noise process into stochastic Pauli noise in some instances. In some embodiments the error estimating system 106 does this using any of the techniques disclosed in U.S. patent application Ser. No. 15/882,300, entitled "Systems and Methods for Quantum Computation Using Random Compiling," filed: Jan. 29, 2018, which is hereby incorporated by reference.

The example interface 108 can include all or part of a connector, a data communication network or another type of communication link. For example, the interface 108 can include one or more wired or wireless connections, one or more wired or wireless networks or other communication channels. In some examples, the interface 108 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) or another type of data communication network. In some examples, the interface 108 includes a wired communication interface (e.g., USB, Ethernet, coaxial, optical) that can be connected directly or indirectly between the compiler system 106 and the quantum device 110.

It will also be understood that, although the terms first, second, etc. may be used herein to describe various elements, these elements should not be limited by these terms. These terms are only used to distinguish one element from another. For example, a first mark could be termed a second mark, and, similarly, a second mark could be termed a first mark, without changing the meaning of the description, so long as all occurrences of the first mark are renamed consistently and all occurrences of the second mark are renamed consistently. The first mark, and the second mark are both marks, but they are not the same mark.

The terminology used herein is for the purpose of describing particular implementations only and is not intended to be limiting of the claims. As used in the description of the implementations and the appended claims, the singular forms a, an and the are intended to include the plural forms as well, unless the context clearly indicates otherwise. It will also be understood that the term "and/or" as used herein refers to and encompasses any and all possible combinations of one or more of the associated listed items. It will be further understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

As used herein, the term if may be construed to mean when or upon or in response to determining or in accordance with a determination or in response to detecting, that a stated condition precedent is true, depending on the context. Similarly, the phrase if it is determined (that a stated condition precedent is true) or if (a stated condition precedent is true) or when (a stated condition precedent is true) may be construed to mean upon determining or in response to determining or in accordance with a determination or upon detecting or in response to detecting that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

All references cited herein are incorporated herein by reference in their entirety and for all purposes to the same extent as if each individual publication or patent or patent application was specifically and individually indicated to be incorporated by reference in its entirety for all purposes.

[1] Joseph Emerson, Robert Alicki, and Karol Życzkowski, "Scalable noise estimation with random unitary operators," J. Opt. B 7, 5347 (2005).

[2] Benjamin Lévi, Cecilia C López, Joseph Emerson, and David G. Cory, "Efficient error characterization in quantum information processing," Phys. Rev, A 75, 022314 (2007).

[3] Emanuel Knill, D. Leibfried, R. Reichlc, J. Britton, R. B. Blakestad, J. D. Jost, C. Langer, R. Ozeri, S. Seidelin, and D. J. Wineland, "Randomized benchmarking of quantum gates," Phys. Rev. A 77, 012307 (2008).

[4] Christoph Dankert, Richard Cleve, Joseph Emerson, and Etera Livine, "Exact and approximate unitary 2-designs and their application to fidelity estimation," Phys. Rev. A 80, 012304 (2009).

[5] Easwar Magesan, Jay M. Gambetta, and Joseph Emerson, "Scalable and Robust Randomized Benchmarking of Quantum Processes," Phys. Rev. Lett. 106, 180504 (2011).

[6] Joseph Emerson, Marcus Silva, Osama Moussa, Colm A. Ryan, Martin Laforest, Jonathan Baugh, David G. Cory, and Raymond Laflamme, "Symmetrized characterization of noisy quantum processes." Science (80-), 317, 1893 (2007).

[7] Easwar Magesan, Jay M. Gambetta, Blake R. Johnson, Colm A. Ryan, Jerry M. Chow, Seth T. Merkel, Marcus P. da Silva, George A. Keefe, Mary B. Rothwell, Thomas A. Ohki, Mark B. Ketchen, and Matthias Steffen, "Efficient Measurement of Quantum Gate Error by Interleaved Randomized Benchmarking," Phys. Rev. Lett. 109, 080505 (2012).

[8] Joel J. Wallman, Christopher Granade, Robin Harper, and Steven T. Flammia, "Estimating the Coherence of Noise," New J. Phys. 17, 113020 (2015).

[9] Joel J. Wallman, Marie Barnhill, and Joseph Emerson, "Robust Characterization of Loss Rates," Phys. Rev. Lett. 115, 060501 (2015).

[10] Joel J. Wallman, Marie Barnhill, and Joseph Emerson, "Robust characterization of leakage errors," New J. Phys. 18, 04:3021 (2016).

[11] Arnaud Carignan-Dugas, Joel J. Wallman, and Joseph Emerson, "Characterizing universal gate sets via dihedral benchmarking," Phys, Rev. A 92, 060302 (2015).

[12] Andrew W. Cross, Easwar Magesan, Lev S. Bishop, John A. Smolin, and Jay M. Gambetta, "Scalable randomised benchmarking of non-Clifford gates," npj Quantum Inf. 2, 16012 (2016).

[13] Michael A. Nielsen, "A simple formula for the average gate fidelity of a quantum dynamical operation," Phys. Lett. A 303, 249 (2002).

[14] Steven T. Flammia and Yi-Kai Liu, "Direct Fidelity Estimation from Few Pauli Measurements," Phys. Rev. Lett. 106, 230501 (2011).

[15] Joel J. Wallman and Joseph Emerson, "Noise tailoring for scalable quantum computation via randomized compiling," Phys. Rev. A 94, 052325 (2016).

[16] Easwar Magesan, Jay M. Gambetta, and Joseph Emerson, "Characterizing quantum gates via randomized benchmarking," Phys. Rev. A 85, 042311 (2012).

[17] A. S. Holevo, "Additivity Conjecture and Covariant Channels," Int. J. Quantum Inf. 03, 41-47 (2005).
[18] Wassily Hoeffding, "Probability Inequalities for Sums of Bounded Random Variables," J. Am. Stat. Assoc. 58, 13 (1963).
[19] A. Y. Kitacv, "Quantum computations: algorithms and error correction," Russian Mathematical Surveys 52(6), 1091-1249 (1997).
[20] J. J. Wallman and S. T. Flammia, "Randomized benchmarking with confidence," New J. Phys. 16, 103032 (2014).
[21] S. Beigi and R. König, "Simplified instantaneous non-local quantum computation with applications to position-based cryptography," New J. Plays. 13, 093036 (2011.).

What is claimed:

1. A method for estimating a property of an error in a circuit configured for implementation on an n-qubit quantum system, wherein
   n is a positive integer of three or greater,
   the circuit comprises a gate set, and
   the gate set comprises a first subset of elementary gates ($\mathbb{G}$) and a second subset of elementary gates ($\mathbb{H}$), wherein the first subset of elementary gates comprises a third subset ($\mathbb{T}$) of elementary gates, wherein each respective elementary gate in $\mathbb{T}$ consists of an n-fold tensor product of a plurality of single qubit gates, the method comprising: (A) executing a first procedure, wherein the first procedure comprises:
   (i) preparing the n-qubit quantum system in a state $\psi$,
   (ii) applying $D_1 = T_1$ to the n-qubit quantum system,
   (iii) for each respective clock cycle t in one or more clock cycles t∈{2, . . . , m+1}, (a) applying H to the n-qubit quantum system, wherein H is an elementary gate in the second subset of elementary gates, and then (b) applying a dressed gate $D_t = T_t G H T'_{t-1} H'$ to the n-qubit quantum system, wherein $D_t$ is an element of the first subset of elementary gates,
   (iv) performing a measurement readout procedure R on the n-qubit quantum system; and
(B) repeating the first procedure for (i) one or more values of $\vec{T}$ or (ii) one or more states $\psi$ or (iii) one or more measurement readout procedures R,
wherein: m is a positive integer greater than 1, G is an element of the first subset of elementary gates, $\vec{T} = (T_1, \ldots, T_m, T_{m+1}=I)$, and $T_1, \ldots, T_m$ are elements of $\mathbb{T}$; and for one or more repetitions of the first procedure, the method further comprises:
selecting an n-qubit Pauli matrix P,
selecting a sign $\mu \in \{+,-\}$,\
electing a state .$\psi \to .\psi_{\mu,P}$ that satisfies $P\psi_{\mu P} = \mu \psi_{\mu P}$,
selecting a measurement readout procedure $R \to R_P$ that enables inference of an expectation value of the observable P from the measurement readout procedure $R_P$, and inferring the expectation value of the observable P from the measurement readout procedure $R_P$.

2. The method of claim 1, wherein I is a unitary 1-design.

3. The method of claim 1, wherein
the method further comprises compiling one or more additional operations $P'_t$ into a $D_t$ in an instance of the first procedure subject to the constraint $D_t = T_t P^\dagger_t G H T^\dagger_{t-1} H^\dagger$, wherein $P^\dagger$ is an element of the first set of elementary gates, and the method is repeated for one or more values of the $P^\dagger_t$.

4. The method of claim 1, wherein the method further comprises: compiling an additional n-qubit Pauli matrix that commutes with P into D.sub.1 in an instance of the first procedure subject to the constraint that $D_1 = T_1 G P^\dagger$, and repeating the method for one or more values of $P^\dagger$.

5. The method of claim 1, the method further comprising inferring one or more properties of the error in the circuit using a distribution of the readout values obtained from the measurement readout procedure R over any combination of P, Q, P', Q', $\vec{T}$, and .μ, or any function of the readout values.

6. The method of claim 5, wherein for one or more combinations of states and readout procedures R, and m satisfying the constraint $H^m = I$ for which the first procedure was implemented, and wherein I is the n-qubit identity gate, the inferring comprises: estimating the average value $\hat{R}(\psi, m)$ of readout values of R over a subset of values of P, Q, P', Q', and $\vec{T}$ for which the first procedure was implemented with $\psi$, R, and m, and fitting the average value to:

$$\hat{R}(\psi,m) = A_{\psi,R} f_P (T_{ord(H)-1:0})^{m/ord(H)} B_{\psi,R}.$$

7. The method of claim 1, the method further comprising:
for one or more values of P, μ, and m subject to the constraint $H_m = I$, estimating an average expectation value P(μ, m) of readout values over a subset of values for which the first procedure was implemented with the corresponding selection of .mu.; and fitting one or more values of P(μ, m) to the estimator of P(μ, m):

$$\hat{P}(\mu,m) = A_{\psi,R} f_P (T_{ord(H)-1:0})^{m/ord(H)} B_{\psi,R},$$

or fitting one or more values of P(μ, m) to the estimator of P(μ, m):

$$\sum_{\mu \in \{\pm\}} \mu \hat{P}(\mu, m) = A f_P (T_{ord(H)-1:0})^{m/ord(H)}.$$

8. The method of claim 1, wherein the gate set collectively enables universal quantum computation on the n-qubit quantum system.

9. The method of claim 1, wherein
the subset $\mathbb{T}$ consists of n-fold tensor products of Clifford operations on the n-qubit system, and
the second subset of elementary gates comprises Clifford operations.

10. The method of claim 1, wherein the subset $\mathbb{T}$ consists of a n-fold tensor products of dihedral operations on the n-qubit system.

11. The method of claim 1 wherein the n-qubit system consists of between 3 to 20 qubits.

12. The method of claim 1 wherein the n-qubit system consists of between 51 and 100 qubits.

13. The method of claim 1, wherein the n-qubit system consists of either 5, 16, 17, or 49 qubits.

14. The method of claim 1, wherein the n-qubit system comprises more than 100 qubits.

15. The method of claim 5, wherein a property in the one or more properties of the error in the circuit that is inferred is an average error rate associated with the gates H in a clock cycle in the circuit.

16. The method of claim 5, wherein a property in the one or more properties of the error in the circuit that is inferred is an average error rate associated with the gates HG or GH in a clock cycle in the circuit.

17. The method of claim 1, the method further comprising:
using a distribution of the readout values obtained from the measurement readout procedure R over any combination of P, Q, P', Q', $\hat{T}$, and μ, or a function of the readout values, to determine a capacity of the circuit to perform a quantum algorithm on the n-qubit quantum system.

18. The method of claim 1, the method further comprising:
using a distribution of the readout values obtained from the measurement readout procedure R over any combination of P, Q, P', Q', $\vec{T}$, and µ, or a function of the readout values, to determine a capacity of the circuit to perform an information processing task on the n-qubit quantum system.

19. The method of claim 17, wherein the using determines the capacity of the circuit with randomized compiling invoked.

20. The method of claim 17, wherein the using determines the capacity of the circuit without randomized compiling invoked.

21. The method of claim 1, the method further comprising: using a distribution of the readout values obtained from the measurement readout procedure R over a combination of P, Q, P', Q', $\vec{T}$, and µ, or any function of the readout values, to determine a property of the error in the output, comprising the accuracy or precision, of a quantum circuit that implements a quantum algorithm or other information processing task with or without randomized compiling.

22. The method of claim 1, the method further comprising: using a distribution of the readout values obtained from the measurement readout procedure R over a combination of P, Q, P', Q', $\vec{T}$, and µ, or a function of the readout values, to determine a correlation in a locality of a noise or a cross-talk error between qubits within the n-qubit system, within one clock cycle within the circuit.

23. The method of claim 1, the method further comprising: using a distribution of the readout values obtained from the measurement readout procedure R over a combination of P, Q, P', Q', $\vec{T}$, and µ., or a function of the readout values, to determine a correlation in a noise between qubits, across different clock cycles within the circuit, wherein the noise comprises non-Markovian noise.

24. The method of claim 1, the method further comprising: using a distribution of the readout values obtained from a measurement readout procedure R over any combination of P, Q, P', Q', $\vec{T}$, and µ, or any function of the readout values, to estimate an error rate per cycle in the circuit that is associated with one or more distinct Pauli errors or Pauli-weights.

25. A non-transitory computer readable storage medium and one or more computer programs embedded therein for estimating a property of an error in a circuit configured for implementation on an n-qubit quantum system, wherein n is a positive integer of three or greater,
the circuit comprises a gate set, and
the gate set comprises a first subset of elementary gates ( $\mathbb{G}$ ) and a second subset of elementary gates ( $\mathbb{H}$ ), wherein the first subset of elementary gates comprises a third subset ($\mathbb{T}$) of elementary gates, wherein each respective elementary gate in I consists of an n-fold tensor product of a plurality of single qubit gates, the one or more computer programs comprising instructions which, when executed by a computer system, cause the computer system to perform a method comprising:

(A) executing a first procedure, wherein the first procedure comprises:
(i) preparing the n-qubit quantum system in a state ψ,
(ii) applying $D_1=T_1$ to the n-qubit quantum system,
(iii) for each respective clock cycle t in one or more clock cycles t∈{2, ..., m+1}, (a) applying H to the n-qubit quantum system, wherein H is an elementary gate in the second subset of elementary gates, and then (b) applying a gate $D_t=T_t GHT^\dagger_{t-1}H^\dagger$ to the n-qubit quantum system, wherein $D_t$ is an element of the first subset of elementary gates,
(iv) performing a measurement readout procedure R on the n-qubit quantum system; and
(B) repeating the first procedure for (i) one or more values of $\vec{T}$ or (ii) one or more states ψ or (iii) one or more measurement readout procedures R, wherein: m is a positive integer greater than 1, G is an element of the first subset of elementary gates, $\vec{T}$= $(T_1, \ldots, T_m, T_{m+1}=1)$, and $T_1, \ldots, T_m$ are elements of $\mathbb{T}$; and for, one or more repetitions of the first procedure, the method further comprises:
selecting an n-qubit Pauli matrix P,
selecting a sign µ∈{+,−},\
electing a state .ψ→.ψ$_{µ,P}$ that satisfies Pψ$_{µ,P}$=µψ$_{µ,P}$.,
selecting a measurement readout procedure R→R$_P$ that enables inference of an expectation value of the observable P from the measurement readout procedure R$_P$, and inferring the expectation value of the observable P from the measurement readout procedure R$_P$.

26. A computer system for estimating a property of an error in a circuit configured for implementation on an n-qubit quantum system, wherein n is a positive integer of three or greater,
the circuit comprises a gate set, and
the gate set comprises a first subset of elementary gates ( $\mathbb{G}$ ) and a second subset of elementary gates ( $\mathbb{H}$ ), wherein the first subset of elementary gates comprises a third subset ($\mathbb{T}$) of elementary gates, wherein each respective elementary gate in I consists of an n-fold tensor product of a plurality of single qubit gates, the computer system comprising one or more processors, a memory, and one or more program, wherein the one or more programs are stored in the memory and are configured to be executed by the one or more processors, the one or more programs including instructions for:

(A) executing a first procedure, wherein the first procedure comprises:
(i) preparing the n-qubit quantum system in a state ψ,
(ii) applying $D_1=T_1$ to the n-qubit quantum system,
(iii) for each respective clock cycle t in one or more clock cycles t∈{2, ..., m+1}, (a) applying H to the n-qubit quantum system, wherein H is an elementary gate in the second subset of elementary gates, and then (b) applying a gate $D_t=T_t GHT^\dagger_{t-1}H^\dagger$ to the n-qubit quantum system, wherein $D_t$ is an element of the first subset of elementary gates,
(iv) performing a measurement readout procedure R on the n-qubit quantum system; and
(B) repeating the first procedure for (i) one or more values of $\vec{T}$ or (ii) one or more states ψ or (iii) one or more measurement readout procedures R, wherein: m is a positive integer greater than 1, G is an element of the first subset of elementary gates, $\vec{T}$= $(T_1, \ldots, T_m, T_{m+1}=I)$, and $T_1, \ldots, T_m$ are elements of $\mathbb{T}$; and for one or more repetitions of the first procedure, the method further comprises:

selecting an n-qubit Pauli matrix P, selecting a sign $\mu \in \{+,-\}$, electing a state $.\psi \rightarrow .\psi_{\mu P}$ that satisfies $P\psi_{\mu P}=\mu\psi_{\mu P}.$, selecting a measurement readout procedure $R \rightarrow R_P$ that enables inference of an expectation value of the observable P from the measurement readout procedure $R_P$, and inferring the expectation value of the observable P from the measurement readout procedure $R_P$.

* * * * *

UNITED STATES PATENT AND TRADEMARK OFFICE
CERTIFICATE OF CORRECTION

| | | |
|---|---|---|
| PATENT NO. | : 11,580,000 B2 | Page 1 of 1 |
| APPLICATION NO. | : 16/042978 | |
| DATED | : February 14, 2023 | |
| INVENTOR(S) | : Joel J. Wallman et al. | |

It is certified that error appears in the above-identified patent and that said Letters Patent is hereby corrected as shown below:

In the Claims

In Column 15, Line 35 (Approx.), in Claim 1, delete "$T_tGHT^t_{t-1}H^{t'}$" and insert -- $T_tGHT^f_{t-1}H^f$ --.

In Column 15, Line 57, in Claim 2, delete "T" and insert -- $T$ --.

In Column 16, Line 33 (Approx.), in Claim 7, delete "$m/ord(H)$." and insert -- $m/ord/(H)$. --.

In Column 16, Line 44, in Claim 10, delete " $T$ " and insert -- $T$ --.

In Column 17, Line 61, in Claim 25, delete "$(T)$," and insert -- $(T)$ --.

In Column 17, Line 62, in Claim 25, delete "T" and insert -- $T$ --.

In Column 18, Line 9 (Approx.), in Claim 25, delete "$D_t$—$T_t$" and insert -- $D_t = T_t$ --.

In Column 18, Line 20, in Claim 25, delete "=1)," and insert -- =1), --.

In Column 18, Line 21, in Claim 25, delete " $T$ " and insert -- $T$ --.

In Column 18, Line 40 (Approx.), in Claim 26, delete "T" and insert -- $T$ --.

Signed and Sealed this
Twentieth Day of June, 2023

*Katherine Kelly Vidal*
Katherine Kelly Vidal
*Director of the United States Patent and Trademark Office*